(12) United States Patent
Hanaki et al.

(10) Patent No.: US 8,455,391 B2
(45) Date of Patent: Jun. 4, 2013

(54) EXHAUST GAS PURIFYING CATALYST AND MANUFACTURING METHOD OF THE SAME

(75) Inventors: Yasunari Hanaki, Yokohama (JP); Hiroshi Akama, Zushi (JP); Hitoshi Onodera, Yokosuka (JP); Toru Nishizawa, Fujisawa (JP); Yoshiaki Hiramoto, Yokosuka (JP); Hideaki Morisaka, Yokohama (JP); Masahiro Takaya, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 61 days.

(21) Appl. No.: 12/992,008

(22) PCT Filed: Mar. 30, 2009

(86) PCT No.: PCT/JP2009/001455
§ 371 (c)(1),
(2), (4) Date: Nov. 10, 2010

(87) PCT Pub. No.: WO2009/139107
PCT Pub. Date: Nov. 19, 2009

(65) Prior Publication Data
US 2011/0071019 A1    Mar. 24, 2011

(30) Foreign Application Priority Data

May 12, 2008  (JP) .................................. 2008-124592

(51) Int. Cl.
*B01J 23/00*  (2006.01)
*B01J 21/00*  (2006.01)
*B01J 20/00*  (2006.01)

(52) U.S. Cl.
USPC ........... 502/304; 502/240; 502/241; 502/242; 502/243; 502/258; 502/259; 502/260; 502/261; 502/262; 502/263

(58) Field of Classification Search
USPC .......... 502/240–439, 527.12, 527.13, 527.19, 502/527.24
See application file for complete search history.

(56) References Cited

U.S. PATENT DOCUMENTS

| | | | | |
|---|---|---|---|---|
| 4,798,711 A * | 1/1989 | Neal et al. | ................... | 423/239.1 |
| 4,940,569 A * | 7/1990 | Neal et al. | ................... | 423/239.1 |
| 6,294,140 B1* | 9/2001 | Mussmann et al. | ........ | 423/213.5 |
| 6,306,794 B1* | 10/2001 | Suzuki et al. | ................. | 502/304 |
| 6,348,430 B1* | 2/2002 | Lindner et al. | ................ | 502/304 |
| 7,449,427 B2* | 11/2008 | Ohno et al. | .................... | 502/439 |

(Continued)

FOREIGN PATENT DOCUMENTS

| | | |
|---|---|---|
| CN | 101039749 A | 9/2007 |
| DE | 102004040548 A1 | 2/2006 |

(Continued)

*Primary Examiner* — Cam N. Nguyen
(74) *Attorney, Agent, or Firm* — Foley & Lardner LLP

(57) ABSTRACT

An exhaust gas purifying catalyst (1) includes: a three-dimensional structural substrate (10) having a plurality of cells (11) partitioned by cell walls (12) having pores (13); and catalyst layers (20) formed in the three-dimensional structural substrate (10). The catalyst layers (20) have pore-cover portions (22) formed on surfaces (13a) of the pores (13) of the cell walls (12). In addition, the catalyst layers (20) of the pore-cover portions (22) have activated pores (22a) with a pore diameter of 0.1 micrometers to 10 micrometers. In the exhaust gas purifying catalyst (1), the obstruction of the vent holes (pores (13)) in the catalyst layers (20) can be controlled, and the pressure loss can be reduced.

13 Claims, 3 Drawing Sheets

U.S. PATENT DOCUMENTS

| | | | |
|---|---|---|---|
| 7,517,830 B2 * | 4/2009 | Nomura et al. | 502/302 |
| 7,524,350 B2 * | 4/2009 | Kunieda | 55/523 |
| 7,563,744 B2 * | 7/2009 | Klein et al. | 502/326 |
| 7,731,774 B2 * | 6/2010 | Ohno et al. | 55/523 |
| 7,740,817 B2 * | 6/2010 | Matsumoto et al. | 423/213.2 |
| 7,740,819 B2 * | 6/2010 | Morita et al. | 423/247 |
| 7,851,405 B2 * | 12/2010 | Wakamatsu et al. | 502/332 |
| 7,867,598 B2 * | 1/2011 | Miyairi et al. | 428/116 |
| 7,875,250 B2 * | 1/2011 | Nunan | 422/177 |
| 7,951,338 B2 * | 5/2011 | Miyairi et al. | 422/177 |
| 7,977,276 B2 * | 7/2011 | Kikuchi et al. | 502/325 |
| 8,007,750 B2 * | 8/2011 | Chen et al. | 423/239.1 |
| 8,133,841 B2 * | 3/2012 | Noda et al. | 502/439 |
| 8,192,517 B2 * | 6/2012 | Kunieda | 55/523 |
| 2003/0024219 A1 | 2/2003 | Harada et al. | |
| 2004/0259731 A1 | 12/2004 | Yan | |
| 2006/0133969 A1 | 6/2006 | Chiffey et al. | |
| 2006/0254231 A1 | 11/2006 | Hayashi et al. | |
| 2007/0028575 A1 | 2/2007 | Ohno et al. | |
| 2007/0049492 A1 * | 3/2007 | Miyairi et al. | 502/439 |
| 2007/0054803 A1 * | 3/2007 | Miyairi | 502/439 |
| 2007/0065348 A1 | 3/2007 | Ohno et al. | |
| 2008/0070776 A1 * | 3/2008 | Yamaguchi | 502/100 |
| 2008/0125316 A1 | 5/2008 | Noda et al. | |
| 2008/0241011 A1 * | 10/2008 | Ohno et al. | 422/180 |
| 2008/0254978 A1 * | 10/2008 | Kikuchi et al. | 502/303 |
| 2008/0286176 A1 * | 11/2008 | Schirmeister et al. | 422/198 |
| 2009/0129995 A1 | 5/2009 | Pfeifer et al. | |
| 2009/0155134 A1 | 6/2009 | Li | |
| 2009/0326279 A1 * | 12/2009 | Tonkovich et al. | 568/487 |
| 2010/0092358 A1 | 4/2010 | Koegel et al. | |

FOREIGN PATENT DOCUMENTS

| | | |
|---|---|---|
| JP | 9-173866 A | 7/1997 |
| JP | 2001-269585 A | 10/2001 |
| JP | 2002-295228 A | 10/2002 |
| JP | 2005-224666 A | 8/2005 |
| JP | 2008-510604 A | 4/2008 |
| JP | 2009-160547 A | 7/2009 |
| WO | WO 2006/035822 A1 | 4/2006 |
| WO | WO 2006-035823 A1 | 4/2006 |
| WO | WO 2006/070504 A1 | 7/2006 |
| WO | WO 2007/026844 A1 | 3/2007 |
| WO | WO 2008/022967 A1 | 2/2008 |

* cited by examiner

EXHAUST GAS PURIFYING CATALYST AND MANUFACTURING METHOD OF THE SAME

TECHNICAL FIELD

The present invention relates to an exhaust gas purifying catalyst and a manufacturing method of the same. More specifically, the present invention relates to a catalyst capable of removing at least particulates of substances included in gas exhausted from a internal combustion engine such as a diesel engine, and purifying an exhaust gas, and relates to a manufacturing method of such a catalyst.

BACKGROUND ART

The exhaust gas exhausted from the internal combustion engine such as a diesel engine includes particulates. The particulates include substances harmful to humans. Therefore, it is required to remove them in view of environmental conservation. Conventionally, a filter catalyst has been used for removing the particulates. As for the filter catalyst, for example, the catalysts described in Patent Citation 1 and Patent Citation 2 have been disclosed.
Patent Citation 1: Japanese Patent Unexamined Publication No. 2002-295228
Patent Citation 2: Japanese Patent Unexamined Publication No. 2005-224666

DISCLOSURE OF INVENTION

However, in such a conventional filter catalyst, there has been a problem that catalyst layers formed on a catalyst substrate makes an opening diameter of pores of the catalyst substrate narrower so that the pores cannot have an enough opening diameter, or the pores are blocked.

Specifically, with regard to the catalyst layers of the filter catalyst, first, a slurry containing alumina and the like is prepared, the slurry is coated on the catalyst substrate, followed by drying and baking so as to form supporting layer. Then, a catalyst metal is supported on the supporting layer. However, when the slurry is coated on the catalyst substrate, the slurry is not dispersed enough within the pores of the catalyst substrate. Therefore, the slurry has been unevenly placed in the vicinity of the openings of the pores of the catalyst substrate. Moreover, since the catalyst layers are formed by drying and baking under such a condition, a reduction in size and an obstruction of the openings of the pores have occurred, and vent holes have not been formed enough to function in the filter catalyst.

While, when the slurry is dispersed enough within the pores of the catalyst substrate, and the catalyst layers are formed on the surface in the pores of the catalyst substrate, the obstruction of the pores of the catalyst substrate in the catalyst layers is controlled to some extent. However, there has been a problem that a pressure loss becomes larger when the catalyst layers are merely formed in the pores of the catalyst substrate since the size of the vent holes of the catalyst substrate is reduced.

The present invention has been made in consideration for such problems inherent in the conventional technology. It is an object of the present invention to provide an exhaust gas purifying catalyst in which the obstruction of the vent holes (pores) in the catalyst layers is controlled and also the pressure loss is reduced, and to provide a manufacturing method of the exhaust gas purifying catalyst.

The first aspect of the present invention provides an exhaust gas purifying catalyst comprising: a three-dimensional structural substrate having a plurality of cells partitioned by cell walls having first pores; and catalyst layers formed in the three-dimensional structural substrate, wherein the catalyst layers have pore-cover portions formed on surfaces of the first pores of the cell walls, and the catalyst layers of the pore-cover portions have second pores with a pore diameter of 0.1 micrometers to 10 micrometers.

The second aspect of the present invention provides a manufacturing method of the exhaust gas purifying catalyst comprising: preparing a slurry comprising a catalyst material of which an average particle diameter is 1 micrometer to 10 micrometers, wherein, in the slurry, a content ratio of the catalyst material with a particle diameter of 1 micrometer or less is 20% by mass or less, and a content ratio of the catalyst material with a particle diameter of 10 micrometers or more is 10% by mass or less; and coating the slurry on the three-dimensional structural substrate.

BEST MODE FOR CARRYING OUT THE INVENTION

A description will be made below in detail of an exhaust gas purifying catalyst of the present invention by using the drawings. The exhaust gas purifying catalyst of the present invention includes a three-dimensional structural substrate, and catalyst layers formed on the three-dimensional structural substrate. The three-dimensional structural substrate has a plurality of cells partitioned by cell walls. The cell walls have pores through which an exhaust gas flows. Such a three-dimensional structural substrate includes a so-called honeycomb substrate and checkered honeycomb substrate (wall-flow type substrate).

Figure 1:
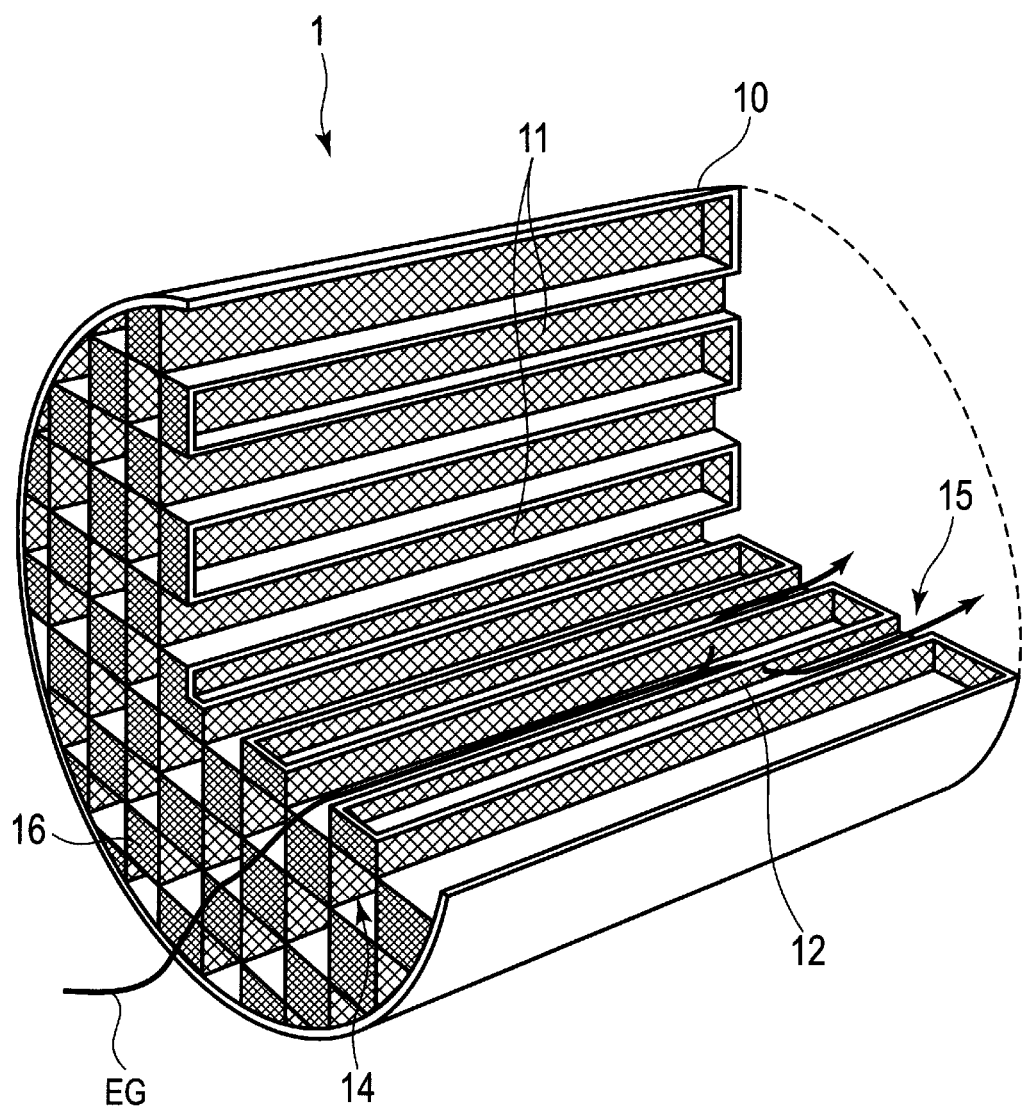
FIG. 1 is a perspective view showing a state where a part of an exhaust gas purifying catalyst of an embodiment using a wall-flow type substrate as a three-dimensional structural substrate is cut out.

FIG. 1 is a partially cut out perspective view cut out on dotted lines in the figure showing an embodiment of the exhaust gas purifying catalyst of the present invention using the wall-flow type substrate as a three-dimensional structural substrate. In the figure, an exhaust gas purifying catalyst 1 includes a checkered honeycomb substrate 10 that is an example of three-dimensional structural substrates.

The checkered honeycomb substrate 10 forms a cylindrical shape as a whole. The checkered honeycomb substrate 10 has a plurality of cells 11 partitioned by cell walls 12 having a plurality of pores 13 (first pores). Each cell 11 is formed in parallel to one another by the cell walls 12. Also, each cell 11 has a sealed end 16 provided on and closing one end of either exhaust gas inlet 14 or exhaust gas outlet 15. In the cells 11 adjacent to one another, the sealed ends 16 are provided alternately on each side of the exhaust gas inlets and outlets. By the above-mentioned sealing relationship of both sides of the cells 11, the checkered honeycomb substrate 10 is provided with a sealing pattern in which each end face of the exhaust gas inlets 14 and the exhaust gas outlets 15 is a checkerboard-style (checkered pattern) as a whole. That means the sealing pattern is formed on each end face of the checkered honeycomb substrate 10, in which the open-close arrangement is inverted between the inlet side and the outlet side of the exhaust gas in the cells 11.

In the checkered honeycomb substrate 10, as shown in the figure, the exhaust gas EG in principle passes through the opening ends (cell inlets 14) of the cells 11, flows into the adjacent cells through the pores 13 of the cell walls 12, and flows out of the opening ends (cell outlets 15) of the cells.

In the exhaust gas purifying catalyst 1 shown in FIG. 1, the catalyst layers are formed on the checkered honeycomb substrate 10. The catalyst layers, especially pore-cover portions described later, are provided with activated pores. Therefore, particulates included in the exhaust gas are trapped and purified by these activated pores, while the increase of the pressure loss when the exhaust gas flows is sufficiently suppressed. Note that, the particulates are occasionally abbreviated as "PM" in the description of the present invention.

Figure 2:
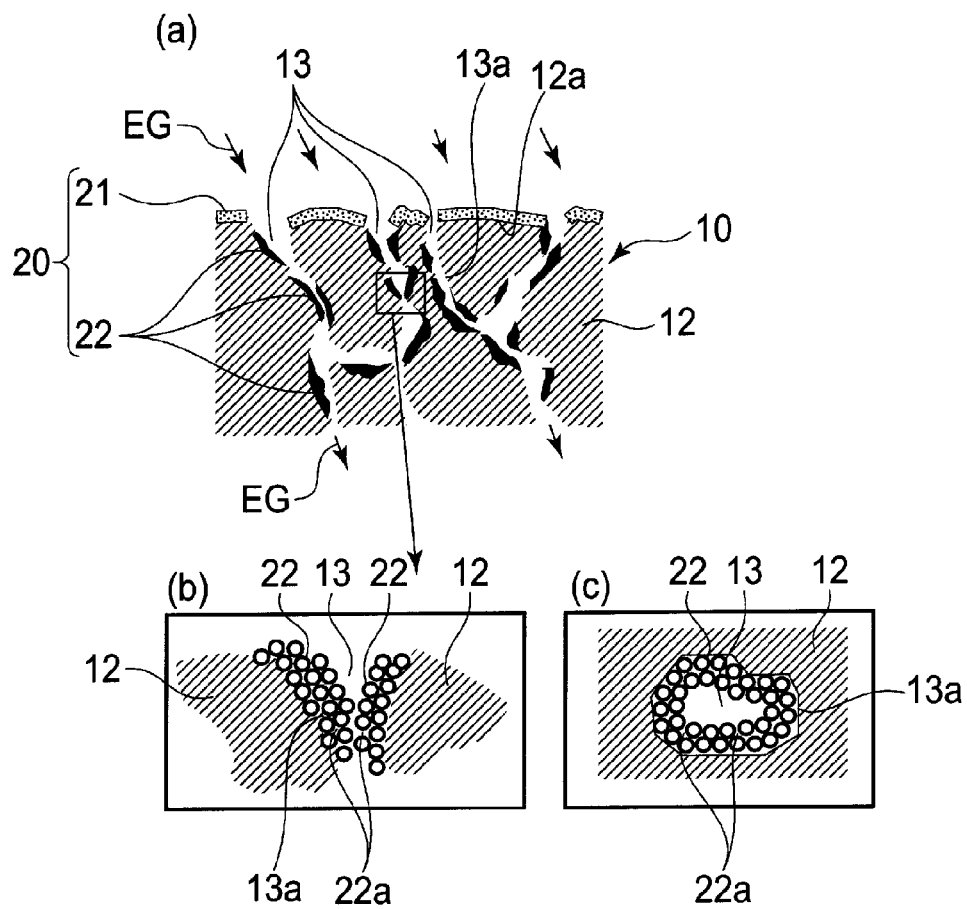
FIG. 2 is a schematic partial cross-sectional view showing a vicinity of cell walls of the three-dimensional structural substrate in the exhaust gas purifying catalyst of the embodiment.

FIG. 2 is a schematic partial cross-sectional view showing a vicinity of the cell walls 12 of the three-dimensional structural substrate 10 in the exhaust gas purifying catalyst of the above-mentioned embodiment. In FIG. 2(a), the three-dimensional structural substrate 10 is provided with the cell walls 12 having a plurality of the pores 13 through which the exhaust gas EG can flow. Catalyst layers 20 are coated on the cell walls 12. In addition, the catalyst layers 20 include surface-cover portions 21 formed on surfaces 12a of the cell walls 12, and pore-cover portions 22 formed on surfaces 13a of the pores 13.

FIG. 2(b) is a cross-sectional view showing an enlargement of one part of FIG. 2(a). FIG. 2(c) is a view showing the view of FIG. 2(b) from a direction perpendicular to the surfaces 12a of the cell walls 12. As shown in these figures, the pore-cover portions 22 formed along the pores 13 of the cell walls 12 have activated pores 22a (second pores) with high porosity and a pore diameter of 0.1 micrometers to 10 micrometers.

The activated pores 22a are formed when the catalyst layers 20 are supported on the three-dimensional structural substrate 10, and derived from a catalyst material included in the catalyst layers 20. The activated pores 22a have the pore diameter with the proper size as described above. Therefore, since the exhaust gas can favorably flow through the activated pores 22a, it is possible to control the increase of the pressure loss effectively. Moreover, by setting the pore diameter of the activated pores 22a at 0.1 micrometers to 10 micrometers, it is possible to trap the particulates effectively while enabling the exhaust gas to adequately flow through. Furthermore, it is possible to sufficiently oxidize the particulates trapped by the pore-cover portions 22 due to a catalyst component in the pore-cover portions 22. In the exhaust gas purifying catalyst 10 as described above, it is possible to prevent from the increase of the pressure loss of the exhaust gas purifying catalyst 10. In addition, since the catalyst layers 20 can trap and oxidize the particulates by the catalyst material that the catalyst layers 20 include, the trapped particulates can be removed efficiently.

Figure 3:
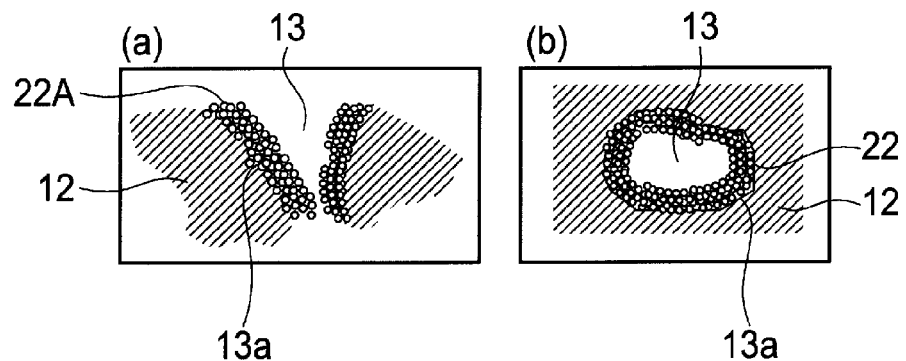
FIG. 3 is a schematic partial cross-sectional view showing a vicinity of cell walls of a three-dimensional structural substrate in a conventional exhaust gas purifying catalyst.

FIG. 3 is a schematic partial cross-sectional view showing a vicinity of cell walls of a three-dimensional structural substrate in a conventional exhaust gas purifying catalyst. FIG. 3(a) corresponds to FIG. 2(b), and FIG. 3(b) corresponds to FIG. 2(c). In the conventional exhaust gas purifying catalyst, a porosity of pore-cover portions 22A is low as shown in FIGS. 3(a) and 3(b). Therefore, it is difficult for the exhaust gas to pass through the pore-cover portions 22A. As a result, since the particulates can hardly be trapped by the pore-cover portions 22A, the particulates are not sufficiently oxidized by the pore-cover portions 22A. Moreover, since the dense pore-cover portions 22A are present in the pores 13 of the cell walls 12, the flow property of the exhaust gas is lowered. Thus, it results in the increase of the pressure loss of the exhaust gas purifying catalyst.

As for the three-dimensional structural substrate 10 used for the exhaust gas purifying catalyst of the present invention, not only the checkered honeycomb substrate but also the standard honeycomb substrate can be used. In each substrate, however, 4 to 80% of the pores 13 present in the cell walls 12 preferably have the pore diameter of 10 micrometers to 50 micrometers, and the porosity of 40% by volume or more. It is still possible to achieve the effect of the present invention even if the pore diameter and porosity of the pores 13 of the three-dimensional structural substrate 10 are not within the above-mentioned range. However, when the pore diameter and porosity of the pores 13 of the cell walls 12 go out of the above-mentioned range, a relatively large amount of catalyst component penetrates inside of the three-dimensional structural substrate 10 even if the catalyst component is attempted to be adhered onto the surfaces 12a of the three-dimensional structural substrate 10 by use of a slurry of the catalyst component as described later. Therefore, the particulates deposited on the surfaces 12a of the cell walls 12 of the three-dimensional structural substrate 10 may not be oxidized sufficiently. Note that, preferably, an upper limit of the porosity of the cell walls is set at 70% by volume or less from a viewpoint of maintaining strength of the three-dimensional structural substrate itself. In addition, substrates with the above-mentioned range can be easily obtained since the substrates having various ranges of size and porosity of pores have been available commercially as a three-dimensional structural substrate.

With regard to a material of the above-mentioned three-dimensional structural substrate, ceramics, ceramic foam, and metal foam can be included. Specifically, cordierite, silicon carbide (SiC), and mullite can be included as ceramics. As for the ceramic foam, a formed material such as cordierite, silicon carbide (SiC), and mullite can be included. As for the foamed metal, a material formed from ferrite-series stainless steel can be included.

Next, a description will be made below in further detail of the catalyst layers and the activated pores of the exhaust gas purifying catalyst of the present invention. As described above, especially the pore-cover portions 22 of the catalyst layers 20 have the activated pores 22a having the diameter of 0.1 micrometers to 10 micrometers. The activated pores 22a are derived from the catalyst material of the catalyst layers 20.

Preferably, the surface-cover portions 21 also have the activated pores with high porosity and a diameter of 0.1 micrometers to 10 micrometers similar to the pore-cover portions 22. Thus, when the surface-cover portions 21 also have the adequate pores through which the exhaust gas can pass, it is possible to prevent from the increase of the pressure loss of the exhaust gas purifying catalyst 10. Moreover, the trapped particulates can be removed effectively since it is possible to trap and oxidize the particulates by the catalyst material that the surface-cover portions 21 also include. However, it is not an essential element in the present invention that the activated pores are present in the surface-cover portions 21.

Then, the pore diameter of the activated pores is set at 10 micrometers or less so that the exhaust gas passing through the pores 13 of the three-dimensional structural substrate can also pass through the catalyst layers 20. Therefore, the increase of the pressure loss is suppressed. In addition, although the extremely small particulates, such as several micrometers, may enter the activated pores of the catalyst layers, contacting property between the catalyst material, especially the catalyst component, and the particulates in the activated pores is quite good. Therefore, the effect of improving oxidation performance of the particulates can be expected. Furthermore, temperature increase of the catalyst layers because of the gas reaction can be expected due to the improvement of the contacting property between the catalyst material and the particulates.

On the other hand, when the pore diameter of the activated pores is above 10 micrometers, the catalyst layers cannot be formed and held in the pores of the three-dimensional structural substrate. Then, the pores of the substrate are blocked by the exfoliated catalyst material, or the surfaces of the substrate are exposed without the catalyst layers formed thereon. Therefore, not only the pressure loss is increased when using such an exhaust gas purifying catalyst, but also the contact areas between the catalyst and the particulates are reduced. Thus, the oxidation performance of the particulates is lowered. While, when the pore diameter of the activated pores is less than 0.1 micrometers, the exhaust gas hardly passes through since the pore diameter is too small. Therefore, the pressure loss may not be lowered.

With regard to the exhaust gas purifying catalyst of the present invention, preferably, a total pore volume of the pores with the pore diameter of 0.1 micrometers to 10 micrometers accounts for 5 to 30% of the entire pore volume of all pores in the catalyst. That means the pores with the pore diameter of 0.1 micrometers to 10 micrometers include the activated pores described above and the pores that the three-dimensional structural substrate itself has. Accordingly, the total pore volume of these pores preferably corresponds to 5 to 30% of the entire pore volume in the exhaust gas purifying catalyst.

Regarding the exhaust gas purifying catalyst of the present invention, the effect of the present invention can be achieved even when the total pore volume of the pores with the pore diameter of 0.1 micrometers to 10 micrometers is not within the above-mentioned range. However, there is a possibility that an exhaust pressure is increased since the sufficient passages for the exhaust gas in the catalyst layers cannot be obtained when the above-mentioned ratio is less than 5%. In addition, the effect of the catalyst may be reduced since the contact areas between the exhaust gas and the catalyst are not enough. While, when the ratio is over 30%, the pressure loss of the entire three-dimensional structural substrate including the catalyst layers may be increased since the average pore diameter of the cell walls of the three-dimensional structural substrate is reduced.

Regarding the exhaust gas purifying catalyst of the present invention, 5 to 100%, preferably 10 to 35%, of the total pore volume of the pores with the pore diameter of 0.1 micrometers to 10 micrometers preferably corresponds to the total pore volume of the activated pores. This relationship can be defined by the following formula.

$$\frac{A}{A+B} \times 100 = 5 - 100 (\%) \quad [\text{Math. 1}]$$

A: Pore volume of activated pores

B: Pore volume of three-dimensional structural substrate itself with pore diameter of 0.1 micrometers to 10 micrometers Note that, the pores with the pore diameter of 0.1 micrometers to 10 micrometers may not be present in the three-dimensional structural substrate itself. In this case, 100% of the pores with the diameter of 0.1 micrometers to 10 micrometers are composed of the activated pores of the catalyst layers. The ratio of above formula represents the percentage of the activated pores formed when the catalyst layers are formed. When the ratio is less than 5%, PM entering the pores of 0.1 micrometers to 10 micrometers may not be oxidized sufficiently since the amount of the catalyst is small.

Figure 4:
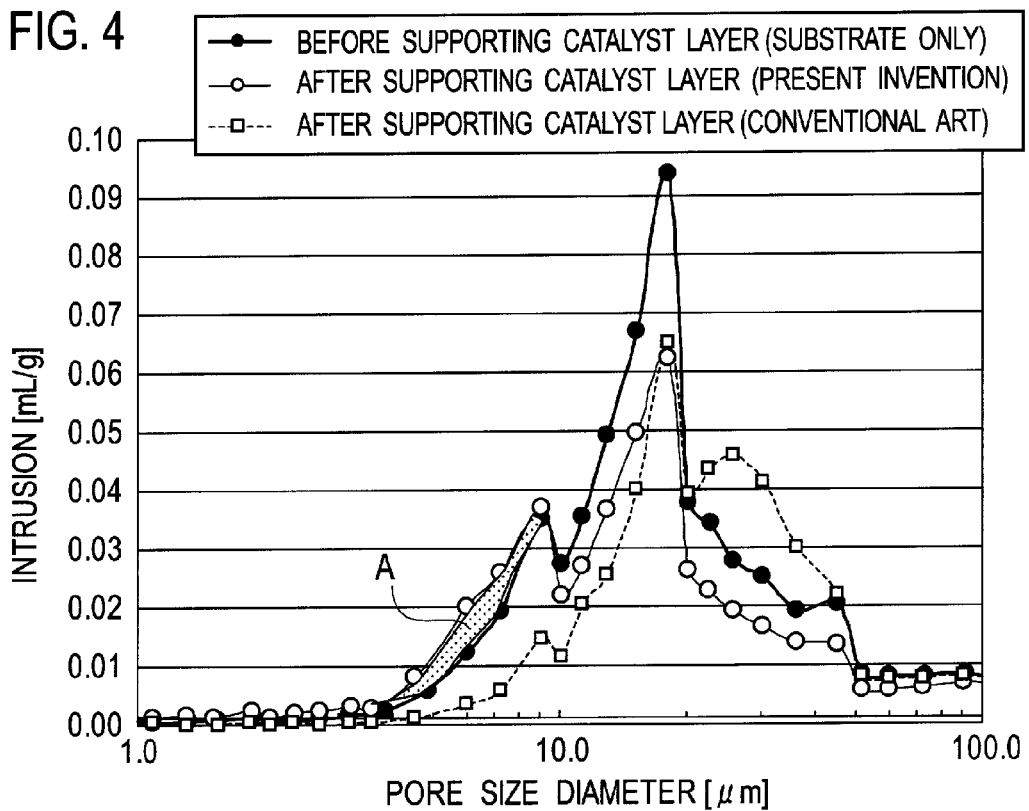
FIG. 4 is a graph showing pore size distributions of the three-dimensional structural substrate, the exhaust gas purifying catalyst of the embodiment, and the conventional exhaust gas purifying catalyst.

The pore volume of the substrate itself can be evaluated by a mercury intrusion porosimetry by use of a mercury porosimeter as described later. FIG. 4 shows an example of the result that the pore volume of the substrate itself is measured by use of the mercury porosimeter. According to the result of FIG. 4, the pore volumes of the pores with the pore diameter of 0.1 micrometers to 10 micrometers are integrated, so that the pore volume of the substrate itself within this range can be evaluated.

Also, the pore volume of the activated pores can be evaluated as described below. First, the pore volume of the substrate itself is measured by use of the mercury porosimeter. Next, the catalyst layers are supported on the substrate so as to form the exhaust gas purifying catalyst. Then, the pore volume of the entire exhaust gas purifying catalyst is measured by use of the mercury porosimeter. FIG. 4 shows the measured result of the pore volume of the entire exhaust gas purifying catalyst. In FIG. 4, the part shown as a reference sign A in the range of the pore diameter of 0.1 micrometers to 10 micrometers shows the pore volume of the activated pores later formed due to supporting the catalyst layers. Thus, the pore volume of the activated pores in the catalyst layers can be evaluated by calculating the area of the part of the reference sign A.

As for the exhaust gas purifying catalyst of the present invention, a total pore volume of the pores with the pore diameter of over 10 micrometers to 100 micrometers or less preferably accounts for 70 to 95% of the entire pore volume of all pores in the exhaust gas purifying catalyst. That means the pores with the pore diameter of over 10 micrometers to 100 micrometers or less include the activated pores derived from the catalyst layers described above, and the pores that the three-dimensional structural substrate itself has. Accordingly, the total pore volume of these pores preferably corresponds to 70 to 95% of the entire pore volume in the exhaust gas purifying catalyst.

The effect of the present invention can be achieved even when the total pore volume of the pores with the pore diameter of over 10 micrometers to 100 micrometers or less is not within the above-mentioned range. However, there is a possibility that the effect of the catalyst may be reduced since the contact areas between the exhaust gas and the catalyst material are not enough when the above-mentioned ratio is over 95%. In addition, when the ratio is less than 70%, the pressure loss of the entire catalyst may be increased since the average pore diameter of the cell walls of the three-dimensional structural substrate including the catalyst layers is reduced. The total pore volume of the pores with the pore diameter of over 10 micrometers to 100 micrometers or less can be evaluated by the graph of FIG. 4. That means the total pore volume of the pores with the range of the above-mentioned diameter can be evaluated by means of calculating a peak area within the range of over 10 micrometers to 100 micrometers or less in the exhaust gas purifying catalyst. Also, the entire pore volume in the exhaust gas purifying catalyst can be evaluated by means of calculating a peak area of the entire range of the exhaust gas purifying catalyst.

The total pore volume of the pores with the pore diameter of over 10 micrometers to 100 micrometers or less in the exhaust gas purifying catalyst is less than that in the three-dimensional structural substrate. Preferably, a ratio of reduced volume is 1 to 35%. This relationship can be defined by the following formula.

$$\frac{C-D}{C} \times 100 = 1 - 35(\%) \qquad [\text{Math. 2}]$$

C: Total pore volume of pores with pore diameter of over 10 micrometers to 100 micrometers or less before supporting catalyst layers D: Total pore volume of pores with pore diameter of over 10 micrometers to 100 micrometers or less after supporting catalyst layers Namely, the pores with the pore diameter of over 10 micrometers to 100 micrometers or less is reduced in principle by forming the catalyst layers, when comparing the pores before forming the catalyst layers to those after forming the catalyst layers as shown in FIG. 4. Preferably, the reduction ratio is 1 to 35%.

The effect of the present invention can be achieved even when the reduction ratio is not within the above-mentioned range. However, the catalyst layers formed in the pores of 10 micrometers or more of the substrate is reduced when the above-mentioned reduction ratio is less than 1%. In view of the fact that gas easily passes through the pores with a larger pore diameter in the substrate, the contacting property between the catalyst layers and the exhaust gas may be lowered when the amount of the catalyst layers formed in the pores is small. In addition, when the reduction ratio is over 35%, the pressure loss of the entire catalyst may be increased since the average pore diameter of the cell walls of the substrate including the catalyst layers is reduced. The pore volumes before and after supporting catalyst can be evaluated by means of calculating the peak areas in FIG. 4 as described above.

As mentioned above, the above-described porosity and each ratio are based on the pore volume measurement by means of the mercury intrusion porosimetry.

Next, a description will be made below in detail of the catalyst material composing the catalyst layers. The catalyst material includes the catalyst component and a support. As for the support, a heat resistant inorganic material, such as powder provided by alumina or zirconia, can be used.

Also, the catalyst material preferably includes metal oxide in view of the oxidation and burning of the particulates by the catalytic action. As a preferable metal element included in the metal oxide, cerium (Ce), praseodymium (Pr), gallium (Ga), yttrium (Y), bismuth (Bi), zirconium (Zr) or aluminum (Al), and an element provided by an arbitrary combination of those can be included. Specifically, as for the metal oxide, cerium oxide ($CeO_2$), praseodymium oxide ($Pr_6O_{11}$), yttrium oxide ($Y_2O_3$), bismuth oxide ($Bi_2O_3$), zirconium oxide ($ZrO_2$) or aluminum oxide ($Al_2O_3$), and an element provided by an arbitrary combination of those can be used.

In the present invention, as a catalyst component, iron (Fe), cobalt (Co), manganese (Mn) or nickel (Ni), and oxide of transition metal provided by an arbitrary combination of those can be added. Due to adding those elements, it is possible to purify not only the particulates but also the exhaust gas. Specifically, iron oxide ($FeO$, $Fe_2O_3$, $Fe_3O_4$), manganese oxide ($MnO$, $Mn_2O_3$, $MnO_2$), and the like can be illustrated. In addition to those elements, rare earth oxide, alkali metal oxide, alkali earth metal oxide, and one or more of composite oxide of those can be used.

Also, in the exhaust gas purifying catalyst of the present invention, platinum (Pt), palladium (Pd), rhodium (Rh), silver (Ag) or gold (Au), and noble metal provided by an arbitrary combination of those can be added as a catalyst component. Due to adding those elements, it is possible to purify not only the particulates but also the exhaust gas.

In the exhaust gas purifying catalyst of the present invention, preferably, a supported amount of the catalyst component is 25 to 100 g per liter of the three-dimensional structural substrate. The effect of the present invention can be achieved even when the supported amount of the catalyst component is not within the above-mentioned range. However, when the supported amount of the catalyst component is less than 25 g/l, the particulate oxidation effect may not be obtained sufficiently since the amount of the catalyst component is small and the contacting property between the particulates and the catalyst component is degraded. While, when the supported amount of the catalyst component is more than 100 g/l, the particulates and the catalyst component are fully in contact with each other, and therefore, the effect is almost saturated even if the amount of the catalyst component is increased more. Then, it is not just that the further improvement of the particulate oxidation effect cannot be achieved, but the amount of the catalyst supported in the pores of the three-dimensional structural substrate may be increased. Further, a large amount of the catalyst component may be supported in the pore inlet portion. As a result, the pores are blocked, and the pressure loss may be increased.

Next, a description will be made below in detail of a manufacturing method of the exhaust gas purifying catalyst of the present invention. In order to manufacture the above-described exhaust gas purifying catalyst, first, the slurry including the catalyst material forming the catalyst layers is prepared. Next, the prepared slurry is applied to the above-mentioned three-dimensional structural substrate, followed by drying and baking so as to obtain the catalyst layers.

Then, as for the above-described slurry, the slurry, in which the average particle diameter of the catalyst material is 1 micrometer to 10 micrometers, the content ratio of the catalyst material with the particle diameter of 1 micrometer or less is 20% by mass or less, and the content ratio of the catalyst material with the particle diameter of 10 micrometers or more is 10% by mass or less, is used. Preferably, the slurry, in which the content ratio of the catalyst material with the particle diameter of 1 micrometer or less is 10% by mass or less, is used. More preferably, the slurry, in which the content ratio of the catalyst material with the particle diameter of 10 micrometers or more is 5% by mass or less, is used.

Due to controlling the particle diameter of the catalyst material powder in the slurry as described above, the catalyst component can be distributed within the pores of the three-dimensional structural substrate. Moreover, the activated pores enabling gas to pass through and possible to improve the catalytic activity can be formed in the catalyst layers formed in the pores, especially in the pore-cover portions. The particle size distribution of the catalyst material powder in the slurry can be measured by use of a particle size distribution measurement device by means of Laser diffraction particle size analysis. Note that the above-mentioned average particle diameter represents a median size (D50).

In the above-described particle diameter regulation, when the content ratio of the catalyst material with the particle diameter of 1 micrometer or more is over 20% by mass, the amount of the slurry entering the pores of the three-dimensional structural substrate is increased. Thus, the pores are blocked, and the pressure loss may be increased. In addition, when the content ratio of the catalyst material with the particle diameter of 10 micrometers or more is over 10% by mass, the amount of the catalyst material supported in the pores of the three-dimensional structural substrate is decreased since the particles becomes too large. Therefore, the contacting property between the particulates and the catalyst component is degraded, and the particulate oxidation effect is lowered.

The slurry having the above-mentioned particle diameter can be obtained by mixing the catalyst material into a solvent such as water, followed by milling the mixture. By using a ball mill and beads mill when milling the mixture, the slurry, in which the average particle diameter is 1 micrometer to 10 micrometers and the content ratio of the catalyst material with the particle diameters of 1 micrometer or less and 10 micrometers or more is low, can be obtained. Also, the similar slurry can be obtained by dry milling the catalyst material in advance, followed by mixing the milled catalyst material into a solvent such as water. In this case, as a dry-milling, a jet milling machine and the like can be used.

When preparing the slurry to be used regarding the manufacturing method of the exhaust gas purifying catalyst of the present invention, powder supporting at least one of the following transition metal oxide and noble metal on the following inorganic oxide is preferably used as the above-described catalyst material. As an inorganic oxide, an oxide of cerium (Ce), praseodymium (Pr), gallium (Ga), yttrium (Y), bismuth (Bi), zirconium (Zr), aluminum (Al), and the like can be used. As a transition metal oxide, an oxide of iron (Fe), cobalt (Co), manganese (Mn), nickel (Ni), and the like can be used. As a noble metal, platinum (Pt), palladium (Pd), rhodium (Rh), silver (Ag), gold (Au), and the like can be used. Due to using such a supported powder, it is possible to purify not only the particulates but also the exhaust gas.

In the manufacturing method of the present invention, the slurry including the above-described catalyst material is preferably used by adding a solid disappearing material provided by activated carbon particles, resin particles, cellulose particles or chaff, and an arbitrary mixture of those. It is still possible to form a plurality of activated pores in the catalyst layers without adding such a solid disappearing material. However, the activated pores are easily formed in the catalyst layers formed in the pores of the three-dimensional structural substrate by means of the process of adding the disappearing material to the slurry, followed by baking to remove the disappearing material after coating with the slurry.

Preferably, the disappearing material with the average particle diameter (D50) of 0.5 micrometers to 5 micrometers is used. When the average particle diameter is less than 0.5 micrometers, the sufficient effect of the disappearing material may not be achieved since the particles of the disappearing material are too small. While, when the average particle diameter is over 5 micrometers, the catalyst layers are merely segmented, and the aimed pores may not be formed since the particle diameter of the disappearing material is too large.

In addition, preferably, the added amount of the disappearing material is 10 to 30% by mass with respect to the slurry including the catalyst material. When the added amount is less than 10% by mass, the sufficient effect of the disappearing material may not be achieved. While, when the added amount is over 30% by mass, the catalyst layers are merely segmented, and the aimed pores may not be formed.

The above-described manufacturing method of the present invention can be performed according to the following representative steps.

First, the catalyst material as a raw material of the catalyst layers, specifically the above-mentioned metal oxide, the support such as alumina as needed, and the disappearing material such as activated carbon particles, are mixed so as to prepare the slurry. In this case, the catalyst material included in the slurry is adjusted so that the average particle diameter (D50) is 1 micrometer to 10 micrometers, the content ratio of the catalyst material with the particle diameter of 1 micrometer or less is 20% by mass or less, and the content ratio of the catalyst material with the particle diameter of 10 micrometers or more is 10% by mass or less when the total amount of the catalyst material is 100% by mass.

Then, the obtained slurry is coated on the three-dimensional structural substrate such as a wall-flow type substrate. In this case, the coated amount (oxide conversion) of the slurry per liter of the (apparent) volume of the wall-flow type substrate is preferably as follows. The coated amount of the slurry is preferably 50 g or less per liter of the volume of the substrate when the average particle diameter of the catalyst material in the slurry is 1 micrometer to 10 micrometers, the content ratio of the catalyst material with the particle diameter of 1 micrometer or less is 20% by mass or less, and the content ratio of the catalyst material with the particle diameter of 10 micrometers or more is 10% by mass or less. In addition, the coated amount of the slurry is preferably 100 g or less per liter of the volume of the substrate when the average particle diameter of the catalyst material in the slurry is 1 micrometer to 10 micrometers, the content ratio of the catalyst material with the particle diameter of 1 micrometer or less is 10% by mass or less, and the content ratio of the catalyst material with the particle diameter of 10 micrometers or more is 5% by mass or less. Note that, the coated amount of the slurry can be determined by the masses of the substrate before and after coated with the slurry.

The coating of the slurry on the wall-flow type substrate is performed by applying the slurry to the surface of the substrate, removing the excessive slurry, drying, followed by baking the dried slurry. Thus, the catalyst layers are formed.

The noble metal component such as platinum (Pt), palladium (Pd), rhodium (Rh), silver (Ag) and gold (Au) can be supported by immersing into a liquid containing the metal oxide, followed by baking. The noble metal component can be also supported by forming the catalyst layers composed of the metal oxide on the three-dimensional structural substrate, immersing the substrate into the noble metal component solution, followed by drying and baking.

Mode for the Invention

A description will be made below more in detail of the present invention by using Examples and Comparative Examples. However, the present invention is not limited to these Examples.

EXAMPLE 1

488 ml of a dinitrodiamine platinum solution (8.02% by mass) and 450 g of cerium/praseodymium composite oxide powder (Ce:Pr=7:3 (molar ratio)) were mixed into 1000 g of water, whereby platinum was supported onto the cerium/praseodymium composite oxide powder. A supported amount of the platinum was set at 8% by mass.

450 g of the platinum-supported cerium/praseodymium composite oxide powder and 50 g of alumina sol were mixed into 2000 g of water, followed by stirring, whereby a slurry was prepared. An average particle diameter of the catalyst material in the slurry measured by Laser diffraction particle size analysis was 2.90 micrometers. A content ratio of the catalyst material with a particle diameter of 1 micrometer or less was 12.00% by mass, and a content ratio of the catalyst material with a particle diameter of 10 micrometers or more was 9.60% by mass.

Next, a three-dimensional structural substrate (a cordierite-made honeycomb substrate) was prepared, in which a diameter was 143.764 mm, a height was 152.4 mm, a cell density was 300/in$^2$, an average pore diameter was 18 micrometers, and porosity was 59% by volume. This three-dimensional structural substrate was immersed into the above-described slurry, and excessive slurry was then removed therefrom, followed by drying at 150 degrees Celsius for two hours and baking at 400 degrees Celsius for four hours so as to form catalyst layers. In such a way, an exhaust gas purifying catalyst of this Example was obtained. A formed amount of the catalyst layers was 50 g per liter of the exhaust gas purifying catalyst.

In the honeycomb substrate used in the Example, one of the openings formed on both ends of each cell is sealed by a sealing member, and the openings next to each other of each end surface of the substrate are alternately sealed. That means, approximately half of the multiple cells have the openings on one end, and the others have the openings on the other end. Each end surface of the honeycomb substrate is provided with the sealed cells and the open cells that are arranged alternately. Therefore, the substrate is a wall-flow type substrate of which each end surface is in a checkered pattern.

Table 1 shows the catalyst component of the exhaust gas purifying catalyst, the formed amount of the catalyst layers, the used slurry property, and the like of this Example.

EXAMPLE 2

The same operations as Example 1 were repeated except that a formed amount of the catalyst layers was 25 g per liter of the exhaust gas purifying catalyst, whereby an exhaust gas purifying catalyst of this Example was obtained. Table 1 shows the catalyst component of the exhaust gas purifying catalyst, the formed amount of the catalyst layers, the used slurry property, and the like of this Example.

EXAMPLE 3

The same operations as Example 1 were repeated except that a formed amount of the catalyst layers was 100 g per liter of the exhaust gas purifying catalyst, whereby an exhaust gas purifying catalyst of this Example was obtained. Table 1 shows the catalyst component of the exhaust gas purifying catalyst, the formed amount of the catalyst layers, the used slurry property, and the like of this Example.

EXAMPLE 4

450 g of cerium/praseodymium composite oxide powder (Ce:Pr=7:3 (molar ratio)) and 50 g of alumina sol were mixed into 2000 g of water, followed by stirring, whereby a slurry was prepared. An average particle diameter measured by Laser diffraction particle size analysis was 2.50 micrometers. A content ratio of the catalyst material with a particle diameter of 1 micrometer or less was 9.99% by mass, and a content ratio of the catalyst material with a particle diameter of 10 micrometers or more was 8.12% by mass.

Next, a three-dimensional structural substrate (a cordierite-made honeycomb substrate) was prepared, in which a diameter was 143.764 mm, a height was 152.4 mm, a cell density was 300/in$^2$, an average pore diameter was 18 micrometers, and porosity was 59% by volume. This three-dimensional structural substrate was immersed into the above-described slurry, and excessive slurry was then removed therefrom, followed by drying at 150 degrees Celsius for two hours and baking at 400 degrees Celsius for four hours so as to form catalyst layers. In such a way, an exhaust gas purifying catalyst of this Example was obtained. A formed amount of the catalyst layers was 25 g per liter of the exhaust gas purifying catalyst. Table 1 shows the catalyst component of the exhaust gas purifying catalyst, the formed amount of the catalyst layers, the used slurry property, and the like of this Example.

EXAMPLE 5

A manganese nitrate solution and 450 g of cerium/praseodymium composite oxide powder (Ce:Pr=7:3 (molar ratio)) were mixed into 1000 g of water, whereby manganese was supported onto the cerium/praseodymium composite oxide powder. A supported amount of the manganese was set at 20% by mass.

450 g of the manganese-supported cerium/praseodymium composite oxide powder and 50 g of alumina sol were mixed into 2000 g of water, followed by stirring, whereby a slurry was prepared.

Next, a three-dimensional structural substrate (a cordierite-made honeycomb substrate) was prepared, in which a diameter was 143.764 mm, a height was 152.4 mm, a cell density was 300/in$^2$, an average pore diameter was 18 micrometers, and porosity was 59% by volume. This three-dimensional structural substrate was immersed into the above-described slurry, and excessive slurry was then removed therefrom, followed by drying at 150 degrees Celsius for two hours and baking at 400 degrees Celsius for four hours so as to form catalyst layers. In such a way, an exhaust gas purifying catalyst of this Example was obtained. A formed amount of the catalyst layers was 25 g per liter of the exhaust gas purifying catalyst. Table 1 shows the catalyst component of the exhaust gas purifying catalyst, the formed amount of the catalyst layers, the used slurry property, and the like of this Example.

EXAMPLE 6

A manganese nitrate solution and 450 g of cerium/praseodymium composite oxide powder (Ce:Pr=7:3 (molar ratio)) were mixed into 1000 g of water, whereby manganese was supported onto the cerium/praseodymium composite oxide powder. A supported amount of the manganese was set at 20% by mass.

488 ml of a dinitrodiamine platinum solution (8.02% by mass) and 450 g of the manganese-supported cerium/praseodymium composite oxide powder (Ce:Pr=7:3 (molar ratio)) were mixed into 1000 g of water, whereby platinum was supported onto the cerium/praseodymium composite oxide powder. A supported amount of the platinum was set at 8% by mass.

450 g of the platinum/manganese-supported cerium/praseodymium composite oxide powder and 50 g of alumina sol were mixed into 2000 g of water, followed by stirring, whereby a slurry was prepared.

Next, a three-dimensional structural substrate (a cordierite-made honeycomb substrate) was prepared, in which a diameter was 143.764 mm, a height was 152.4 mm, a cell density was 300/in$^2$, an average pore diameter was 18 micrometers, and porosity was 59% by volume. This three-dimensional structural substrate was immersed into the above-described slurry, and excessive slurry was then removed therefrom, followed by drying at 150 degrees Celsius for two hours and baking at 400 degrees Celsius for four hours so as to form catalyst layers. In such a way, an exhaust gas purifying catalyst of this Example was obtained. A formed amount of the catalyst layers was 25 g per liter of the exhaust gas purifying catalyst. Table 1 shows the catalyst component of the exhaust gas purifying catalyst, the formed amount of the catalyst layers, the used slurry property, and the like of this Example.

EXAMPLE 7

An iron nitrate solution and 450 g of cerium/praseodymium composite oxide powder (Ce:Pr=7:3 (molar ratio)) were mixed into 1000 g of water, whereby iron was supported onto the cerium/praseodymium composite oxide powder. A supported amount of the iron was set at 20% by mass.

450 g of the iron-supported cerium/praseodymium composite oxide powder and 50 g of alumina sol were mixed into 2000 g of water, followed by stirring, whereby a slurry was prepared.

Next, a three-dimensional structural substrate (a cordierite-made honeycomb substrate) was prepared, in which a diameter was 143.764 mm, a height was 152.4 mm, a cell density was 300/in$^2$, an average pore diameter was 18 micrometers, and porosity was 59% by volume. This three-dimensional structural substrate was immersed into the above-described slurry, and excessive slurry was then removed therefrom, followed by drying at 150 degrees Celsius for two hours and baking at 400 degrees Celsius for four hours so as to form catalyst layers. In such a way, an exhaust gas purifying catalyst of this Example was obtained. A formed amount of the catalyst layers was 25 g per liter of the exhaust gas purifying catalyst. Table 1 shows the catalyst component of the exhaust gas purifying catalyst, the formed amount of the catalyst layers, the used slurry property, and the like of this Example.

EXAMPLE 8

An iron nitrate solution and 450 g of cerium/praseodymium composite oxide powder (Ce:Pr=7:3 (molar ratio)) were mixed into 1000 g of water, whereby iron was supported onto the cerium/praseodymium composite oxide powder. A supported amount of the iron was set at 20% by mass.

488 ml of a dinitrodiamine platinum solution (8.02% by mass) and 450 g of the iron-supported cerium/praseodymium composite oxide powder (Ce:Pr=7:3 (molar ratio)) were mixed into 1000 g of water, whereby platinum was supported onto the cerium/praseodymium composite oxide powder. A supported amount of the platinum was set at 8% by mass.

450 g of the platinum/iron-supported cerium/praseodymium composite oxide powder and 50 g of alumina sol were mixed into 2000 g of water, followed by stirring, whereby a slurry was prepared.

Next, a three-dimensional structural substrate (a cordierite-made honeycomb substrate) was prepared, in which a diameter was 143.764 mm, a height was 152.4 mm, a cell density was 300/in$^2$, an average pore diameter was 18 micrometers, and porosity was 59% by volume. This three-dimensional structural substrate was immersed into the above-described slurry, and excessive slurry was then removed therefrom, followed by drying at 150 degrees Celsius for two hours and baking at 400 degrees Celsius for four hours so as to form catalyst layers. In such a way, an exhaust gas purifying catalyst of this Example was obtained. A formed amount of the catalyst layers was 25 g per liter of the exhaust gas purifying catalyst. Table 1 shows the catalyst component of the exhaust gas purifying catalyst, the formed amount of the catalyst layers, the used slurry property, and the like of this Example.

EXAMPLE 9

450 g of cerium/gallium composite oxide (Ce:Ga=95:5 (molar ratio)) powder and 50 g of alumina sol were mixed into 2000 g of water, followed by stirring, whereby a slurry was prepared.

Next, a three-dimensional structural substrate (a cordierite-made honeycomb substrate) was prepared, in which a diameter was 143.764 mm, a height was 152.4 mm, a cell density was 300/in$^2$, an average pore diameter was 18 micrometers, and porosity was 59% by volume. This three-dimensional structural substrate was immersed into the above-described slurry, and excessive slurry was then removed therefrom, followed by drying at 150 degrees Celsius for two hours and baking at 400 degrees Celsius for four hours so as to form catalyst layers. In such a way, an exhaust gas purifying catalyst of this Example was obtained. A formed amount of the catalyst layers was 25 g per liter of the exhaust gas purifying catalyst. Table 1 shows the catalyst component of the exhaust gas purifying catalyst, the formed amount of the catalyst layers, the used slurry property, and the like of this Example.

EXAMPLE 10

488 ml of a dinitrodiamine platinum solution (8.02% by mass) and 450 g of cerium/gallium composite oxide powder (Ce:Ga=95:5 (molar ratio)) were mixed into 1000 g of water, whereby platinum was supported onto the cerium/gallium composite oxide powder. A supported amount of the platinum was set at 8% by mass.

450 g of the platinum-supported cerium/gallium composite oxide powder and 50 g of alumina sol were mixed into 2000 g of water, followed by stirring, whereby a slurry was prepared.

Next, a three-dimensional structural substrate (a cordierite-made honeycomb substrate) was prepared, in which a diameter was 143.764 mm, a height was 152.4 mm, a cell density was 300/in$^2$, an average pore diameter was 18 micrometers, and porosity was 59% by volume. This three-dimensional structural substrate was immersed into the above-described slurry, and excessive slurry was then removed therefrom, followed by drying at 150 degrees Celsius for two hours and baking at 400 degrees Celsius for four hours so as to form catalyst layers. In such a way, an exhaust gas purifying catalyst of this Example was obtained. A formed amount of the catalyst layers was 25 g per liter of the exhaust gas purifying catalyst. Table 1 shows the catalyst component of the exhaust gas purifying catalyst, the formed amount of the catalyst layers, the used slurry property, and the like of this Example.

EXAMPLE 11

A manganese nitrate solution and 450 g of cerium/gallium composite oxide powder (Ce:Ga=95:5 (molar ratio)) were mixed into 1000 g of water, whereby manganese was supported onto the cerium/gallium composite oxide powder. A supported amount of the manganese was set at 20% by mass.

450 g of the manganese-supported cerium/gallium composite oxide powder and 50 g of alumina sol were mixed into 2000 g of water, followed by stirring, whereby a slurry was prepared.

Next, a three-dimensional structural substrate (a cordierite-made honeycomb substrate) was prepared, in which a diameter was 143.764 mm, a height was 152.4 mm, a cell density was $300/in^2$, an average pore diameter was 18 micrometers, and porosity was 59% by volume. This three-dimensional structural substrate was immersed into the above-described slurry, and excessive slurry was then removed therefrom, followed by drying at 150 degrees Celsius for two hours and baking at 400 degrees Celsius for four hours so as to form catalyst layers. In such a way, an exhaust gas purifying catalyst of this Example was obtained. A formed amount of the catalyst layers was 25 g per liter of the exhaust gas purifying catalyst. Table 1 shows the catalyst component of the exhaust gas purifying catalyst, the formed amount of the catalyst layers, the used slurry property, and the like of this Example.

EXAMPLE 12

A manganese nitrate solution and 450 g of cerium/gallium composite oxide powder (Ce:Ga=95:5 (molar ratio)) were mixed into 1000 g of water, whereby manganese was supported onto the cerium/gallium composite oxide powder. A supported amount of the manganese was set at 20% by mass.

488 ml of a dinitrodiamine platinum solution (8.02% by mass) and 450 g of the manganese-supported cerium/gallium composite oxide powder (Ce:Ga=95:5 (molar ratio)) were mixed into 1000 g of water, whereby platinum was supported onto the manganese-supported cerium/gallium composite oxide powder. A supported amount of the platinum was set at 8% by mass.

450 g of the platinum/manganese-supported cerium/gallium composite oxide powder and 50 g of alumina sol were mixed into 2000 g of water, followed by stirring, whereby a slurry was prepared.

Next, a three-dimensional structural substrate (a cordierite-made honeycomb substrate) was prepared, in which a diameter was 143.764 mm, a height was 152.4 mm, a cell density was $300/in^2$, an average pore diameter was 18 micrometers, and porosity was 59% by volume. This three-dimensional structural substrate was immersed into the above-described slurry, and excessive slurry was then removed therefrom, followed by drying at 150 degrees Celsius for two hours and baking at 400 degrees Celsius for four hours so as to form catalyst layers. In such a way, an exhaust gas purifying catalyst of this Example was obtained. A formed amount of the catalyst layers was 25 g per liter of the exhaust gas purifying catalyst. Table 1 shows the catalyst component of the exhaust gas purifying catalyst, the formed amount of the catalyst layers, the used slurry property, and the like of this Example.

EXAMPLE 13

An iron nitrate solution and 450 g of cerium/gallium composite oxide powder (Ce:Ga=95:5 (molar ratio)) were mixed into 1000 g of water, whereby iron was supported onto the cerium/gallium composite oxide powder. A supported amount of the iron was set at 20% by mass.

450 g of the iron-supported cerium/gallium composite oxide powder and 50 g of alumina sol were mixed into 2000 g of water, followed by stirring, whereby a slurry was prepared.

Next, a three-dimensional structural substrate (a cordierite-made honeycomb substrate) was prepared, in which a diameter was 143.764 mm, a height was 152.4 mm, a cell density was $300/in^2$, an average pore diameter was 18 micrometers, and porosity was 59% by volume. This three-dimensional structural substrate was immersed into the above-described slurry, and excessive slurry was then removed therefrom, followed by drying at 150 degrees Celsius for two hours and baking at 400 degrees Celsius for four hours so as to form catalyst layers. In such a way, an exhaust gas purifying catalyst of this Example was obtained. A formed amount of the catalyst layers was 25 g per liter of the exhaust gas purifying catalyst. Table 1 shows the catalyst component of the exhaust gas purifying catalyst, the formed amount of the catalyst layers, the used slurry property, and the like of this Example.

EXAMPLE 14

An iron nitrate solution and 450 g of cerium/gallium composite oxide powder (Ce:Ga=95:5 (molar ratio)) were mixed into 1000 g of water, whereby iron was supported onto the cerium/gallium composite oxide powder. A supported amount of the iron was set at 20% by mass.

488 ml of a dinitrodiamine platinum solution (8.02% by mass) and 450 g of the iron-supported cerium/gallium composite oxide powder (Ce:Ga=95:5 (molar ratio)) were mixed into 1000 g of water, whereby platinum was supported onto the iron-supported cerium/gallium composite oxide powder. A supported amount of the platinum was set at 8% by mass.

450 g of the platinum/iron-supported cerium/gallium composite oxide powder and 50 g of alumina sol were mixed into 2000 g of water, followed by stirring, whereby a slurry was prepared.

Next, a three-dimensional structural substrate (a cordierite-made honeycomb substrate) was prepared, in which a diameter was 143.764 mm, a height was 152.4 mm, a cell density was $300/in^2$, an average pore diameter was 18 micrometers, and porosity was 59% by volume. This three-dimensional structural substrate was immersed into the above-described slurry, and excessive slurry was then removed therefrom, followed by drying at 150 degrees Celsius for two hours and baking at 400 degrees Celsius for four hours so as to form catalyst layers. In such a way, an exhaust gas purifying catalyst of this Example was obtained. A formed amount of the catalyst layers was 25 g per liter of the exhaust gas purifying catalyst. Table 1 shows the catalyst component of the exhaust gas purifying catalyst, the formed amount of the catalyst layers, the used slurry property, and the like of this Example.

EXAMPLE 15

450 g of cerium/yttrium composite oxide (Ce:Y=9:1 (molar ratio)) powder and 50 g of alumina sol were mixed into 2000 g of water, followed by stirring, whereby a slurry was prepared.

Next, a three-dimensional structural substrate (a cordierite-made honeycomb substrate) was prepared, in which a diameter was 143.764 mm, a height was 152.4 mm, a cell density was $300/in^2$, an average pore diameter was 18 micrometers, and porosity was 59% by volume. This three-dimensional structural substrate was immersed into the above-described slurry, and excessive slurry was then removed therefrom, followed by drying at 150 degrees Celsius for two hours and baking at 400 degrees Celsius for four hours so as to form catalyst layers. In such a way, an exhaust gas purifying catalyst of this Example was obtained. A formed amount of the catalyst layers was 25 g per liter of the exhaust gas purifying catalyst. Table 1 shows the catalyst component of the exhaust gas purifying catalyst, the formed amount of the catalyst layers, the used slurry property, and the like of this Example.

EXAMPLE 16

A manganese nitrate solution and 450 g of cerium/yttrium composite oxide powder (Ce:Y=9:1 (molar ratio)) were mixed into 1000 g of water, whereby manganese was supported onto the cerium/yttrium composite oxide powder. A supported amount of the manganese was set at 20% by mass.

450 g of the manganese-supported cerium/yttrium composite oxide powder and 50 g of alumina sol were mixed into 2000 g of water, followed by stirring, whereby a slurry was prepared.

Next, a three-dimensional structural substrate (a cordierite-made honeycomb substrate) was prepared, in which a diameter was 143.764 mm, a height was 152.4 mm, a cell density was 300/in$^2$, an average pore diameter was 18 micrometers, and porosity was 59% by volume. This three-dimensional structural substrate was immersed into the above-described slurry, and excessive slurry was then removed therefrom, followed by drying at 150 degrees Celsius for two hours and baking at 400 degrees Celsius for four hours so as to form catalyst layers. In such a way, an exhaust gas purifying catalyst of this Example was obtained. A formed amount of the catalyst layers was 25 g per liter of the exhaust gas purifying catalyst. Table 1 shows the catalyst component of the exhaust gas purifying catalyst, the formed amount of the catalyst layers, the used slurry property, and the like of this Example.

EXAMPLE 17

The same operations as Example 1 were repeated except that a concentration of platinum was 2% by mass, whereby an exhaust gas purifying catalyst of this Example was obtained. Table 1 shows the catalyst component of the exhaust gas purifying catalyst, the formed amount of the catalyst layers, the used slurry property, and the like of this Example.

COMPARATIVE EXAMPLE 1

488 ml of a dinitrodiamine platinum solution (8.02% by mass) and 450 g of cerium/praseodymium composite oxide powder (Ce:Pr=7:3 (molar ratio)) were mixed into 1000 g of water, whereby platinum was supported onto the cerium/praseodymium composite oxide powder. A supported amount of the platinum was set at 8% by mass.

450 g of the platinum-supported cerium/praseodymium composite oxide powder and 50 g of alumina sol were mixed into 2000 g of water, followed by stirring, whereby a slurry was prepared.

An average particle diameter measured by Laser diffraction particle size analysis was 0.17 micrometers. A content ratio of the catalyst material with a particle diameter of 1 micrometer or less was 100% by mass, and a content ratio of the catalyst material with a particle diameter of 10 micrometers or more was 0% by mass. The same operations as Example 1 were repeated by use of the obtained slurry, whereby an exhaust gas purifying catalyst of this Example was obtained. Table 1 shows the catalyst component of the exhaust gas purifying catalyst, the formed amount of the catalyst layers, the used slurry property, and the like of this Example.

COMPARATIVE EXAMPLE 2

450 g of cerium/praseodymium composite oxide powder (Ce:Pr=7:3 (molar ratio)) and 50 g of alumina sol were mixed into 2000 g of water, followed by stirring, whereby a slurry was prepared.

An average particle diameter measured by Laser diffraction particle size analysis was 0.07 micrometers. A content ratio of the catalyst material with a particle diameter of 1 micrometer or less was 100% by mass, and a content ratio of the catalyst material with a particle diameter of 10 micrometers or more was 0% by mass. The same operations as Example 1 were repeated by use of the obtained slurry, whereby an exhaust gas purifying catalyst of this Example was obtained. Table 1 shows the catalyst component of the exhaust gas purifying catalyst, the formed amount of the catalyst layers, the used slurry property, and the like of this Example.

Performance Evaluation

The following performance evaluations were carried out with regard to the obtained exhaust gas purifying catalysts of Examples and Comparative Examples as described above.

(Measurement of Average Pore Diameter and Pore Volume)

With regard to the exhaust gas purifying catalysts of the above-mentioned Examples and Comparative Examples, each of the total pore volumes of the predetermined pore diameters indicated in Table 2 was measured, and the activated pore ratios and the like were calculated. Table 2 shows the obtained results. The measurement of the pore diameters and pore volumes of the catalysts necessary to calculate the above-mentioned values was performed by use of the mercury porosimeter (AutoPore 9500, made by SHIMADZU CORPORATION).

(Measurement of Pressure Loss)

First, a vehicle exhaust system having a pressure-charging type direct-injection diesel engine of a displacement of 2.5 liters was provided with each exhaust gas purifying catalyst of each Example. A four-cylinder engine of a displacement of 2500 cc made by Nissan Motor Co. Ltd. was used for the evaluations.

In this case, pressure sensors were placed in front of and behind the exhaust gas purifying catalyst provided at the exhaust system, and a constant operation at approximately 2000 rpm was performed. A pressure loss was measured by a measured value by the pressure sensors when 4 grams of particulates were deposited on the exhaust gas purifying catalyst. The pressure loss was determined by the difference between the measured values by the two pressure sensors. In addition, the determination of the particulate deposition was made by maintaining a constant driving time of the engine and evaluating an increased weight after the measurement.

Figure 5:
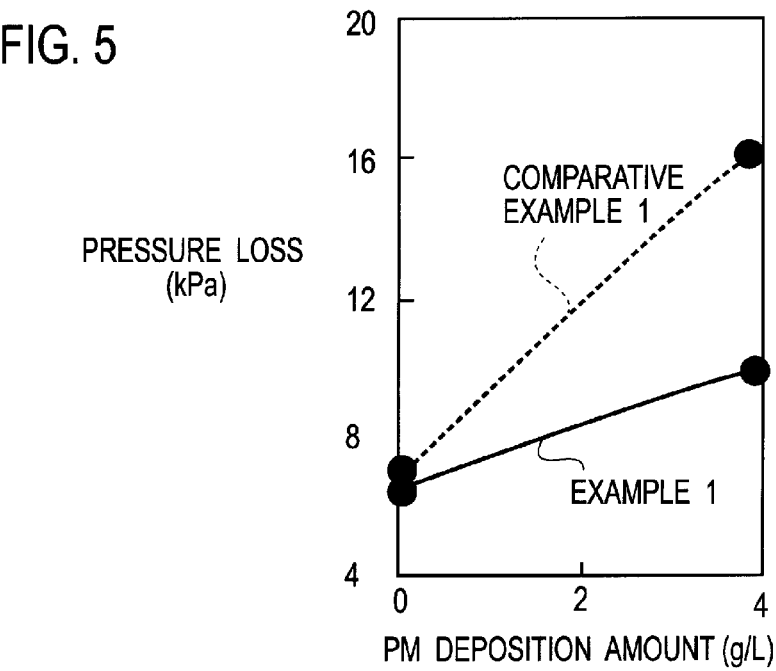
FIG. 5 is a graph showing increase of a pressure loss of Example 1 and Comparative Example 1.

In addition to Table 2 showing the obtained results, FIG. 5 shows the results of Example 1 and Comparative Example 1.

(Measurement of Oxidation Rate of Particulates)

A vehicle exhaust system having a pressure-charging type direct-injection diesel engine of a displacement of 2.5 liters was provided with each exhaust gas purifying catalyst of each Example. A four-cylinder engine of a displacement of 2500 cc made by Nissan Motor Co. Ltd. was used for the evaluations.

Pressure sensors were placed in front of and behind the exhaust gas purifying catalyst provided at the exhaust system, and a constant operation at approximately 2000 rpm was performed.

First, approximately 10 grams of particulates were deposited on the exhaust gas purifying catalyst in the temperature range that an oxidation reaction of the particulates was barely caused in the exhaust gas purifying catalyst. Then, the temperature was rapidly raised to the temperature range that the oxidation reaction of the particulates in the exhaust gas purifying catalyst was activated sufficiently. When the oxidation reaction of the particulates was started, the pressure difference between the pressure sensors provided in front of and behind the exhaust gas purifying catalyst was decreased. Therefore, the time until no more pressure difference of the pressure sensors was recognized was measured, and an oxidation rate of the particulates was evaluated by the amount and the deposition time of the particulates previously deposited on the exhaust gas purifying catalyst. Table 2 also shows the obtained results.

TABLE 1

| | Catalyst Component | | | Amount of | Slurry Property | | |
|---|---|---|---|---|---|---|---|
| | Oxide *1 | Noble Metal Type | Transition Metal Type | Catalyst Layer (g/L) | Average Particle Diameter (μm) | Ratio of Particles of 1 μm or less (mass %) | Ratio of Particles of 10 μm or more (mass %) |
| Ex. 1 | Ce—Pr | Pt | — | 50 | 2.90 | 12.00 | 9.60 |
| Ex. 2 | Ce—Pr | Pt | — | 25 | 2.90 | 12.00 | 9.60 |
| Ex. 3 | Ce—Pr | Pt | — | 100 | 2.90 | 12.00 | 9.60 |
| Ex. 4 | Ce—Pr | — | — | 25 | 2.50 | 9.99 | 8.12 |
| Ex. 5 | Ce—P | — | Mn | 25 | 2.95 | 12.34 | 9.89 |
| Ex. 6 | Ce—Pr | Pt | Mn | 25 | 2.93 | 12.12 | 9.70 |
| Ex. 7 | Ce—Pr | — | Fe | 25 | 2.95 | 12.50 | 9.90 |
| Ex. 8 | Ce—Pr | Pt | Fe | 25 | 2.96 | 12.24 | 9.79 |
| Ex. 9 | Ce—Ga | — | — | 25 | 2.50 | 10.19 | 8.25 |
| Ex. 10 | Ce—Ga | Pt | — | 25 | 2.90 | 12.00 | 9.60 |
| Ex. 11 | Ce—Ga | — | Mn | 25 | 2.97 | 12.30 | 10.02 |
| Ex. 12 | Ce—Ga | Pt | Mn | 25 | 3.02 | 12.49 | 9.99 |
| Ex. 13 | Ce—Ga | — | Fe | 25 | 2.90 | 12.00 | 9.60 |
| Ex. 14 | Ce—Ga | Pt | Fe | 25 | 3.10 | 13.10 | 9.80 |
| Ex. 15 | Ce—Y | — | — | 25 | 2.61 | 10.23 | 8.00 |
| Ex. 16 | Ce—Y | — | Mn | 25 | 2.96 | 11.50 | 9.60 |
| Ex. 17 | Ce—Pr | Pt | — | 50 | 2.90 | 12.00 | 9.60 |
| Com. Ex. 1 | Ce—Pr | Pt | — | 25 | 0.17 | 100 | 0 |
| Com. Ex. 2 | Ce—Pr | — | — | 25 | 0.17 | 100 | 0 |

*1 Ce—Pr: Cerium-Praseodymium Composite Oxide
Ce—Ga: Cerium-Gallium Composite Oxide
Ce—Y: Cerium-Yttrium Composite Oxide

TABLE 2

| | Ratio of Pores of 0.1 to 10 μm (%) *1 | Ratio of Activated Pores of 0.1 to 10 μm (%) *2 | Ratio of Pores of over 10 μm to 100 μm or less (%) *3 | Reduction Rate of Pores of 10 μm or more (%) *4 | Ratio of Pores of 10 to 50 μm (%) *5 | Pressure Loss (kPa) | Oxidation Rate (mg/sec) |
|---|---|---|---|---|---|---|---|
| Ex. 1 | 24.7 | 6.9 | 61.5 | 33.4 | 75.2 | 9.0 | 12.0 |
| Ex. 2 | 23.8 | 4.8 | 71.5 | 27.5 | 75.2 | 8.5 | 11.5 |
| Ex. 3 | 26.6 | 11.0 | 55.0 | 37.3 | 75.2 | 10.0 | 13.0 |
| Ex. 4 | 20.1 | 4.0 | 75.9 | 23.2 | 75.2 | 8.9 | 12.1 |
| Ex. 5 | 16.4 | 6.8 | 79.6 | 23.0 | 75.2 | 9.0 | 12.2 |
| Ex. 6 | 20.3 | 4.1 | 75.7 | 23.5 | 75.2 | 8.9 | 12.1 |
| Ex. 7 | 15.8 | 6.5 | 80.2 | 22.1 | 75.2 | 9.0 | 12.2 |
| Ex. 8 | 20.7 | 4.1 | 75.3 | 23.9 | 75.2 | 8.9 | 12.1 |
| Ex. 9 | 17.4 | 7.2 | 78.6 | 24.4 | 75.2 | 9.0 | 12.2 |
| Ex. 10 | 20.7 | 4.1 | 75.3 | 23.9 | 75.2 | 8.9 | 12.1 |
| Ex. 11 | 18.5 | 7.6 | 77.5 | 25.9 | 75.2 | 9.1 | 12.3 |
| Ex. 12 | 21.5 | 4.3 | 74.5 | 24.9 | 75.2 | 9.0 | 12.1 |
| Ex. 13 | 18.5 | 7.6 | 77.5 | 25.9 | 75.2 | 9.1 | 12.3 |
| Ex. 14 | 22.0 | 4.4 | 74.0 | 25.4 | 75.2 | 9.0 | 12.1 |
| Ex. 15 | 17.7 | 7.3 | 78.3 | 24.8 | 75.2 | 9.0 | 12.2 |
| Ex. 16 | 22.0 | 4.4 | 74.0 | 25.4 | 75.2 | 9.0 | 12.1 |
| Ex. 17 | 24.7 | 9.8 | 71.3 | 33.2 | 75.2 | 9.0 | 12.5 |
| Com. Ex. 1 | 4.9 | 0.0 | 94.7 | 3.1 | 75.2 | 16.0 | 7.0 |
| Com. Ex. 2 | 1.2 | 0.0 | 96.0 | 1.2 | 75.2 | 17.0 | 6.0 |

*1 Ratio of Total Pore Volume of Pores with Pore Diameter of 0.1 to 10 μm with respect to Total Pore Volume of All Pores in Catalyst
*2 Ratio of Total Pore Volume of Activated Pores with Pore Diameter of 0.1 to 10 μm with respect to Total Pore Volume of All Pores in Catalyst
*3 Ratio of Total Pore Volume of Pores with Pore Diameter of over 10 μm to 100 μm or less with respect to Total Pore Volume of All Pores in Catalyst
*4 Reduction Ratio defined by Math 2
*5 Ratio of Pores with Pore Diameter of 10 to 50 μm with respect to All Pores in Substrate In accordance with Table 2 and FIG. 4, in the exhaust gas purifying catalysts of Examples 1 to 17 according to the present invention, the pores of the three-dimensional structural substrate are not blocked, and the preferable activated pores are formed on the catalyst layers. Thus, in the exhaust gas purifying catalysts of these Examples, the increase of the pressure loss when the particulates are deposited can be prevented. Also, it is understood that the oxidation performance of the particulates is improved because of the increase of the contact areas between the particulates and the catalyst layers.

In addition, FIG. 4 shows the pore size distributions of the three-dimensional structural substrate used in Examples and Comparative Examples, the catalyst of Example 1 according to the present invention, and the catalyst of Comparative Example 1 according to the conventional art. It is understood that the pores (activated pores) with a range of 0.1 micrometers to 10 micrometers with respect to the three-dimensional structural substrate are increased in the catalyst of the present invention. This is derived from the formation of the catalyst layers on the substrate. Thus, the activated pores prevent from the increase of the pressure loss while trapping the particulates efficiently.

On the other hand, the pores with a range of 0.1 micrometers to 10 micrometers with respect to the three-dimensional structural substrate are significantly decreased in the conventional catalyst. Therefore, it is considered that the pores of the substrate are blocked by the catalyst layers, and the pressure loss is increased.

Although the invention has been described above by reference to certain embodiments of the invention, the invention is not limited to the embodiments described above and modifications may become apparent to these skilled in the art, in light of the teachings herein. The scope of the invention is defined with reference to the following claims. For instance, the exhaust gas purifying catalyst of the present invention can be applied not only to particulate treatment of diesel engines and gasoline engines, but also exhaust gas purifying catalysts for air cleaners, and the like.

The entire contents of a Japanese Patent Application No. P2008-124592 with a filing date of May 12, 2008 is herein incorporated by reference.

Industrial Applicability

According to the present invention, the predetermined activated pores are formed at least on a certain area of the catalyst layers. Thus, it is possible to provide the exhaust gas purifying catalyst in which obstruction of the vent holes (pores) in the catalyst layers is prevented, and provide the manufacturing method of the exhaust gas purifying catalyst.

The invention claimed is:

1. An exhaust gas purifying catalyst, comprising:
a three-dimensional structural substrate having a plurality of cells partitioned by cell walls having first pores; and
catalyst layers formed in the three-dimensional structural substrate,
wherein the catalyst layers have pore-cover portions formed on surfaces of the first pores of the cell walls, and the catalyst layers of the pore-cover portions have second pores with a pore diameter of 0.1 micrometers to 10 micrometers,
wherein the catalyst layers have surface-cover portions formed on surfaces of the cell walls, and the catalyst layers of the surface-cover portions have pores with a pore diameter of 0.1 micrometers to 10 micrometers, and
wherein a total pore volume of pores with a pore diameter of 0.1 micrometers to 10 micrometers accounts for 5 to 30% of an entire pore volume of all pores in the exhaust gas purifying catalyst.

2. An exhaust gas purifying catalyst according to claim 1, wherein 4 to 80% of the first pores of the cell walls in the three-dimensional structural substrate have a pore diameter of 10 micrometers to 50 micrometers, and
porosity of the cell walls is 40% by volume or more.

3. An exhaust gas purifying catalyst according to claim 1, wherein 5 to 100% of the total pore volume in the pores with the pore diameter of 0.1 micrometers to 10 micrometers corresponds to a total pore volume of the second pores in the pore-cover portions.

4. An exhaust gas purifying catalyst according to claim 1, wherein a total pore volume of pores with a pore diameter of over 10 micrometers to 100 micrometers or less accounts for 70 to 95% of an entire pore volume of all pores in the exhaust gas purifying catalyst.

5. An exhaust gas purifying catalyst according to claim 4, wherein the total pore volume of the pores with the pore diameter of over 10 micrometers to 100 micrometers or less in the exhaust gas purifying catalyst is less than a total pore volume of pores with a pore diameter of over 10 micrometers to 100 micrometers or less in the three-dimensional structural substrate, and
a ratio of reduced volume is 1 to 35%.

6. An exhaust gas purifying catalyst according to claim 1, wherein the catalyst layers comprise oxide containing at least one element selected from the group consisting of cerium, praseodymium, gallium, yttrium, zirconium and aluminum.

7. An exhaust gas purifying catalyst according to claim 6, wherein the catalyst layers further comprise oxide of at least one transition metal selected from the group consisting of iron, cobalt, manganese and nickel.

8. An exhaust gas purifying catalyst according to claim 6, wherein the catalyst layers further comprise at least one noble metal selected from the group consisting of platinum, palladium, rhodium, silver and gold.

9. An exhaust gas purifying catalyst according to claim 1, wherein an amount of a catalyst component in the catalyst layers is 25 to 100 g per liter of the three-dimensional structural substrate.

10. An exhaust gas purifying catalyst according to claim 1, wherein a total pore volume of pores with a pore diameter of 0.1 micrometers to 10 micrometers accounts for 15.8 to 26.6% of an entire pore volume of all pores in the exhaust gas purifying catalyst.

11. A manufacturing method of an exhaust gas purifying catalyst comprising: a three-dimensional structural substrate having a plurality of cells partitioned by cell walls having first pores; and catalyst layers formed in the three-dimensional structural substrate, wherein the catalyst layers have pore-cover portions formed on surfaces of the first pores of the cell walls, and the catalyst layers of the pore-cover portions have second pores with a pore diameter of 0.1 micrometers to 10 micrometers, wherein the catalyst layers have surface-cover portions formed on surfaces of the cell walls, and the catalyst layers of the surface-cover portions have pores with a pore diameter of 0.1 micrometers to 10 micrometers, and wherein a total pore volume of pores with a pore diameter of 0.1 micrometers to 10 micrometers accounts for 5 to 30% of an entire pore volume of all pores in the exhaust gas purifying catalyst, the method comprising:

preparing a slurry comprising a catalyst material of which an average particle diameter is 1 micrometer to 10 micrometers, wherein, in the slurry, a content ratio of the catalyst material with a particle diameter of 1 micrometer or less is 20% by mass or less, and a content ratio of the catalyst material with a particle diameter of 10 micrometers or more is 10% by mass or less; and coating the slurry on the three-dimensional structural substrate.

12. A manufacturing method of an exhaust gas purifying catalyst according to claim 11, wherein the catalyst material comprises an inorganic oxide, and at least one of a transition metal oxide and a noble metal supported on the inorganic oxide, the inorganic oxide comprises at least one element selected from the group consisting of cerium, praseodymium, gallium, yttrium, zirconium and aluminum, the transition metal oxide comprises at least one element selected from the group consisting of iron, cobalt, manganese and nickel, and the noble metal comprises at least one selected from the group consisting of platinum, palladium, rhodium, silver and gold.

13. A manufacturing method of an exhaust gas purifying catalyst according to claim 11, wherein the slurry further comprises at least one disappearing material selected from the group consisting of activated carbon particles, resin particles, cellulose particles and chaff.

* * * * *